June 15, 1965   R. H. MICHALSEN   3,188,715
LOCATOR TOOL
Filed Dec. 3, 1962
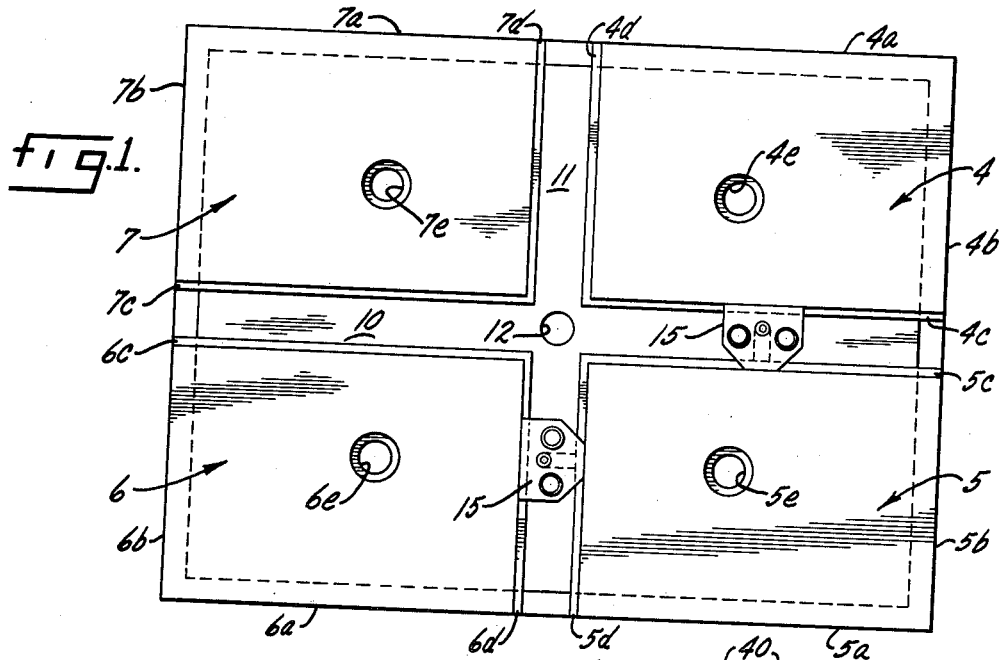
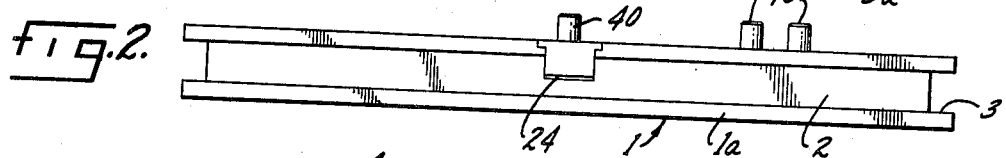
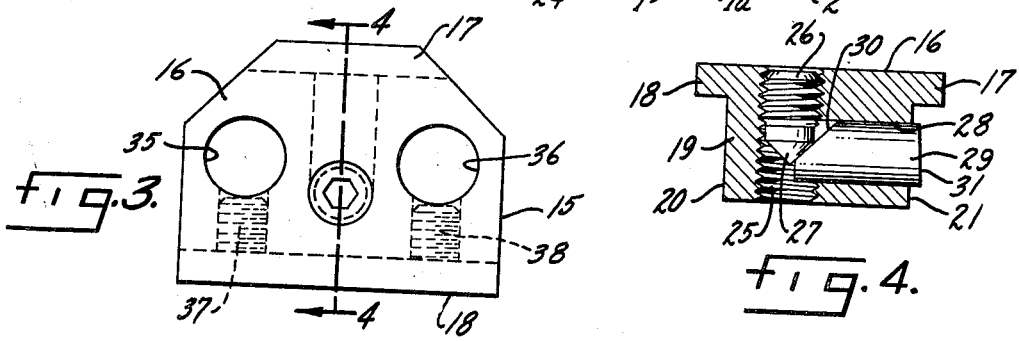
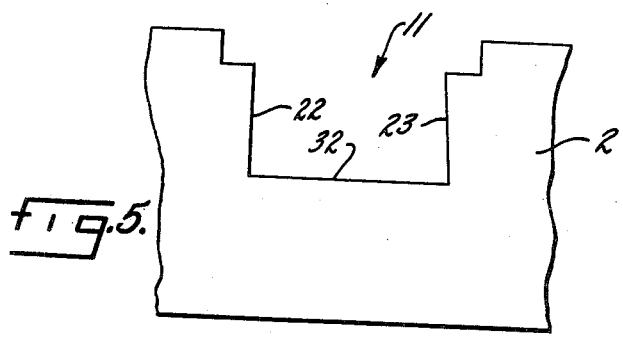
INVENTOR.
Roy H. Michalsen,
BY Parker & Carter
Attorneys.

United States Patent Office 3,188,715
Patented June 15, 1965

3,188,715
LOCATOR TOOL
Roy H. Michalsen, Des Plaines, Ill., assignor to Par Engineering Company, Des Plaines, Ill., a corporation of Illinois
Filed Dec. 3, 1962, Ser. No. 241,665
2 Claims. (Cl. 29—1)

This invention relates to tool mechanisms and has particular relation to locator devices.

One purpose of the invention is to provide a rapid precision work-locating fixture.

Another purpose is to provide a locating fixture for use in machining and inspection operations.

Another purpose is to provide a precision work-locating tool which may be manufactured at a minimum cost.

Another purpose is to provide a precision tool effective to produce a rapid measurement of a workpiece.

Another purpose is to provide a tool which in use may replace the employment of costly fixtures, gauges and the like.

Another purpose is to provide a work-locating fixture effective to reduce the number of man-hours and consequent expense involved in machining and inspection operations, and the like.

Another purpose is to provide a tool for holding and inspecting workpieces and operations that take off from locating holes required in manufacturing engineering.

Other purposes will appear from time to time during the course of the specification and claims.

I illustrate the invention more or less diagrammatically in the accompanying drawings, wherein:

FIGURE 1 is a top plan view;
FIGURE 2 is a side view in cross section;
FIGURE 3 is a detailed plan view on an enlarged scale;
FIGURE 4 is a view taken on the line 4—4 of FIGURE 3; and
FIGURE 5 is a detailed view on the scale of FIGURES 3 and 4.

Like parts are indicated by like numerals throughout the specification and drawings.

Referring now to the drawings and particularly to FIGURES 1 and 2, the numeral 1a indicates generally a rectilinear portion of a base 1. While the base portion 1a and corresponding superstructure of base 1 is shown as rectangular, it will be understood that the general shape thereof may be varied somewhat without departing from the nature and scope of the invention. An intermediate, generally rectilinear portion 2 extends from the base portion 1a and is inwardly offset therefrom as indicated at 3. A set of four quadrants, respectively numbered 4, 5, 6, 7, are formed on the outer or upper surface of the segment 2. The quadrants 4–7 each carry a set of flanges along their two outer surfaces, the said flanges respectively being indicated at 4a, 4b, 5a, 5b, 6a, 6b and 7a, 7b. The two edges opposite and paralleling the flanges of each quadrant have an offset perimeter, the said offsets being indicated at 4c, 4d, 5c, 5d, 6c, 6d and 7c, 7d. It will be observed that the flanges 4a–7b are in precise alignment with the adjacent outer edges of the base 1 which said flanges overlie. It will be further observed that the quadrants 4–7 have a width less than half the width of the base 1 and that the corresponding spacing between opposed parallel offset edges 4c–5c, 5d–6c, 6d–7c and 7d–4d serve to form a set of interpenetrating tracks.

A groove 10 is formed in the segment 2, the side walls of which are spaced apart a distance substantially equal to the inner edges of the opposed parallel perimeter edges of the quadrants 4–7. The groove 10 extends the full length of base segment 2 between the opposed longitudinal edges of quadrants 4 and 5 and of quadrants 6 and 7. A similar groove 11 is formed in the base segment 2 and extends the full width thereof between the opposed lateral edges of quadrants 4 and 7 and of quadrants 5 and 6.

An axis hole 12 extends through the base segment 2 at the precise axis of the intersection of grooves 10, 11.

Offset apertures 4e, 5e, 6e 7e are formed, respectively, in the quadrants 4–7 to provide for penetration of suitable locking fittings which may, when desired, be employed to hold the tool of the invention rigidly in a desired position upon a table or other surface or mechanism.

I provide a plurality of positioner elements or members 15. Since the elements 15 are substantially identical it will suffice, for convenience, to describe one such element 15. The said element 15 comprises a generally rectilinear upper surface 16. A pair of oppositely directed parallel flanges 17, 18 extend from the opposite edges of the member 15, the said flanges being formed and adapted to seat within and ride upon the offsets 4c–7d of the quadrants 4–7, respectively, as may be best seen in FIGURES 1 and 2. The member 15 has a downwardly depending body portion 19, the width of which provides for sliding engagement of the opposite wall surfaces 20, 21 of the body portion 19 along the opposed walls 22, 23, respectively, of the grooves 10, 11.

As may be best seen in FIGURE 2, the member 15 has a depth less than the distance from the bottom wall (such as wall 32) of the grooves 10, 11 to the upper surface of the quadrants 4–7 whereby a space, indicated by the numeral 24, exists between the lower surface of the body portion 19 of members 15 and the opposed bottom wall of grooves 10, 11.

Generally centrally positioned in the member 15 is a threaded well 25 in which an Allen-headed screw member 26 is rotatably positioned. The member 26 has a generally conical end portion 27. A laterally disposed passage 28 communicates with the well 25 in the member 15 and extends outwardly through the side wall 21 thereof. A locking element 29 is slidably positioned within the passage 28 and has a chamfered or angularly disposed inner end wall surface portion 30 formed and adapted for engagement by the conical end surface 27 of member 26.

The outer end wall surface 31 of the member 29 is inclined in angular relationship with the axis of the member 29 and the axis of the passage 28 and may be inclined, for example, at an angle approximating 3 degrees. It will be observed that the wall 23 of groove 11, as indicated in FIGURE 5, is similarly inclined with respect to the wall 22 which is in turn perpendicular to the bottom wall 32 of groove 11, the wall 23 being angled outwardly as it approaches the bottom wall 32 at an angle which may also approximate 3 degrees. It will be understood that the foregoing description with respect to groove 11 applies also to corresponding portions of the groove 10.

Position in the member 15 and spaced from each other are measuring or locating holes 35, 36. The holes 35, 36 may have their walls penetrated intermediate the ends thereof by setscrews, indicated in dotted lines in FIGURE 3 and designated, respectively, by the numerals 37, 38. When desired, locating pins, such as the pin 40 illustrated in FIGURE 2, may be positioned in one or more of the holes represented by the numerals 35, 36 and the said pins 40 may be held in desired position by the associated setscrew, such as that illustrated at 37, 38.

The use and operation of the invention are as follows:

It will be understood that the base 1, including portion 1a, segment 2 and quadrants 4–7, is formed of a precision-hardened and ground steel and may be formed of one piece. The cross-axis hole 12 is permanently established at the precise cross axis of the grooves 10, 11. The measuring holes 35, 36, which are shown as two in number, are so placed on the member 15 as to provide for reception of the maximum and minimum hole spacing.

The joining outer edge surfaces of portion 1a and quadrants 4–7 are ground to 90-degree accuracy within .002 of an inch. Similarly, the paralleling opposite edges of the quadrants 4–7 and the surfaces forming the offsets 4c–7d are formed parallel to each other within .0003 of an inch. The same is true of the bottom surface of segment 1a and the upper surfaces of quadrants 4–7 and the upper surfaces of members 15 lie precisely in the plane of the upper surfaces of quadrants 4–7.

When a piece has been formed and inspection is required, for example, the required number of positioner elements 15 are moved to the desired positions in the grooves 10, 11 using readily available and conventional measuring tools. These positioner members can be accurately set to tolerances within .0003 of an inch along their entire respective axes. Where the piece to be inspected has holes or apertures therein, the suitable number of pins 40 are inserted in a corresponding number of positioner holes such as those shown at 35, 36 in positioner elements 15. The member 26 is then turned inwardly into well 25, the conical surface member 27 engaging the opposed angular surface 30 of lock member 29 to urge the member 29 outwardly of the body portion 19 and to urge the angled surface 31 against the angled wall 23 of the groove, thus locking the positioner element in the desired location on its axis. When the appropriate number of positioner elements and pins 40 have thus been accurately and securely set, the piece to be inspected may be placed over or against the structure of the invention to align the pins 40 with the holes in the piece and thus to determine whether said holes are properly positioned in the piece under inspection.

While the foregoing has been set forth in relation to an inspection procedure and to a workpiece having holes formed therein, it will be understood that the locating and securing of the positioner elements and the placing of the workpiece will correspond when the tool of the invention is used during machining operations and where the holes, such as those shown at 35, 36, are used as such and without the presence of pins 40. It will be further understood that, while two positioner elements 15 are illustrated in FIGURE 1, the number thereof may vary as required without departing from the nature and scope of the invention. Similarly, the size of the plate represented by the numerals 1–7 may vary as required. Other changes may recommend themselves to those skilled in the art without departing from the nature and scope of the invention. While I have shown and described a preferred form of the invention, I therefore wish that the invention shall be limited only within the scope of the appended claims.

I claim:

1. In a tool, a base, a flat upper surface on said base, a set of intersecting grooves formed in said upper surface and intersecting at the precise central axis of said base, each of said grooves having its opposed side walls outwardly offset at their upper edges to provide an upwardly open track, one of said groove side walls lying in a plane substantially perpendicular to the bottom surface of said track, the opposite groove side wall lying in a plane inclined outwardly, downwardly from said offset portion, a unitary positioner element slidable in said track, said positioner element having outwardly extending upper flanges formed and positioned to seat within and for slidable movement along said track, said positioner element having a rectilinear portion depending from the area of said flanges and extending into said groove a distance less than the depth of said groove, said depending portion having opposite side walls paralleling said first-named groove wall, said positioner element being supported by said flanges on said track and having a flat upper surface lying in the precise plane of said base upper surface, a laterally disposed passage in said positioner element, means movable laterally of said positioner element for locking said positioner element at a variety of points along its associated groove, including a pin slidable in said passage and having an outer end surface inclined at the angle of said inclined grooved wall and opposed thereto, said positioner element having an opening perpendicularly positioned therein and upwardly open for reception of positioner pins.

2. In a tool, a base, a flat upper surface on said base, a set of grooves formed in said upper surface and dividing said surface into four equal quadrants, said grooves intersecting at the precise center axis of said base, each of said grooves having outwardly offset upper portions forming an upwardly open track throughout the length of each said groove, a unitary positioner element, said positioner element having outwardly extending flanges formed and adapted for seating in said track, said flanges having a width substantially equal to the width of said track and a depth substantially equal to the depth of said outwardly offset upper portions, said positioner element having a portion depending from the area of said flanges for slidable movement within said groove, said groove having a bottom wall, a first side wall perpendicular to said bottom wall and an opposed side wall outwardly downwardly inclined with respect to said bottom wall, said depending portion having parallel side walls opposed to said groove side walls, said depending portion having a bottom wall upwardly spaced from said grooved bottom wall, said positioner element having a flat upper surface lying in the precise plane of said base upper surface, a lateral passage in said positioner element, a locking pin in said passage and movable laterally of said positioner element and having an inclined outer end surface for mating with said inclined groove wall, means accessible through said flat upper surface of said positioner element for moving said locking pin to urge said locking pin against said inclined groove wall and to lock said positioner element within said groove, said positioner element having upwardly open formations in said flat upper surface for reception of positioner pins and means carried by said positioner element for locking said positioner pins in said formations.

References Cited by the Examiner

UNITED STATES PATENTS

| | | | |
|---|---|---|---|
| 744,559 | 11/03 | Kendrick | 90—58 |
| 1,355,809 | 10/20 | Bryant | 90—58 |
| 1,394,324 | 10/21 | Matthews | 29—1.5 X |
| 1,466,810 | 9/23 | Swanson | 90—58 |
| 1,633,295 | 6/27 | Sutherland | 29—1.7 X |
| 1,750,463 | 3/30 | Deinstein | 269—53 |
| 1,771,058 | 7/30 | Pioch | 29—1.7 |
| 2,430,677 | 11/47 | Hobart | 29—1.5 |
| 2,696,765 | 12/54 | Appleton | 269—50 |
| 2,707,419 | 5/55 | Schron | 29—1.7 |
| 2,782,486 | 2/57 | Delamater | 29—1.7 |

FOREIGN PATENTS

| | | |
|---|---|---|
| 325,074 | 2/30 | Great Britain. |

RICHARD H. EANES, JR., *Primary Examiner.*